United States Patent [19]

Heinze et al.

[11] 4,187,526

[45] Feb. 5, 1980

[54] GAS-DISCHARGE SURGE ARRESTER WITH CONCENTRIC ELECTRODES

[75] Inventors: Klaus D. Heinze; Gerhard Lange, both of Berlin, Fed. Rep. of Germany

[73] Assignee: Siemens Aktiengesellschaft, Berlin & Munich, Fed. Rep. of Germany

[21] Appl. No.: 890,634

[22] Filed: Mar. 20, 1978

[30] Foreign Application Priority Data

Mar. 30, 1977 [DE] Fed. Rep. of Germany ....... 2714122

[51] Int. Cl.[2] ............................................ H02H 9/06

[52] U.S. Cl. .................................... 361/120; 361/129; 313/217

[58] Field of Search ............... 361/117, 119, 120, 129; 313/214, 217

[56] References Cited

U.S. PATENT DOCUMENTS

| | | | |
|---|---|---|---|
| 3,388,274 | 6/1968 | Kawiecki et al. | 361/120 X |
| 3,588,576 | 6/1971 | Kawiecki | 361/120 X |
| 3,651,380 | 3/1972 | Peche et al. | |
| 3,885,203 | 5/1975 | Baker et al. | 361/117 |
| 3,979,646 | 9/1976 | Peche et al. | |

*Primary Examiner*—Harry E. Moose, Jr.
*Attorney, Agent, or Firm*—Hill, Van Santen, Steadman, Chiara & Simpson

[57] ABSTRACT

A surge voltage arrester having two concentrically arranged electrodes separated from each other by a discharge space and insulated from each other by a hollow insulating body outside the discharge space has an electrically conductive layer on the interior surface of the insulating body.

15 Claims, 6 Drawing Figures

GAS-DISCHARGE SURGE ARRESTER WITH CONCENTRIC ELECTRODES

BACKGROUND

1. Field of the Invention

The present invention relates to surge voltage arresters, and more particularly to such voltage arresters having concentrically arranged electrodes.

2. The Prior Art

A surge arrester of the type having two concentrically arranged electrodes separated by a discharge space, and insulated from each other by a hollow cylindrical insulating body located outside the discharge space is illustrated and described in U.S. Pat. No. 3,651,380. In a surge arrester of this type, the response voltage rises in response to the steepness of the waveform of the voltage applied across the surge arrester. The hollow space within the arrester is filled with gas, which is a very good insulator in its unfired state, and accordingly ions must be formed within the gas before a conducting plasma can be created. Because of the time required for ionization of the gas-discharge section, there is a delay in firing the surge arrester, which results in an operation in which the arrester fires at a higher voltage level for a steeply rising voltage than for an applied voltage which rises at a lesser rate.

Various ways of combating the ionization delay have been proposed in the past. In the case of so-called button arresters, a conductive trigger line has been placed on the insulating wall which defines the discharge space, as described in U.S. Pat. No. 3,979,646. In the button arresters, the two electrodes are placed symmetrically opposite each other in a tubular insulating body which defines and surrounds the discharge space. While this technique is effective in the case of button arresters, the ionization delay problem is more difficult in arresters which have electrode structures which are concentrically aligned, because there is then no insulating body which defines a part of the discharge space.

A reduction in the operating voltage can be achieved by the use of radioactive material in either solid or gaseous form. The radiation from the radioactive material causes some ionization of the gas, which reduces the time required to ionize the gas sufficiently to form a conductive plasma. This process has disadvantages, however, among which are the decreasing activity of the radioactive material with time, and a reluctance on the part of some users to use surge arresters with substantial amounts of radioactive material.

Applicants have found that on poorly conductive insulators, a stationary wall charge is formed which induces the countervoltage by means of electrostatic charges, which countervoltage works against a rapid operation of the surge voltage arrester. By neutralizing the countervoltage, applicants have found that it is possible to increase the firing speed of the arrester.

BRIEF DESCRIPTION OF THE PRESENT INVENTION

A principal object of the present invention is to prevent the formation of stationary wall charges which interfere with the rapid firing of a gas-discharge voltage arrester.

In one embodiment of the present invention, there is provided, in a surge voltage arrester having concentrically arranged electrodes separated by a discharge space, and having an insulating body separating the electrodes outside the discharge space, an electrically conductive layer on the interior surface of the insulating body. The electrically conductive layer consists preferably of one to eight continuous, parallel lines applied to the surface of the insulating body by metallic abrasion, graphite abrasion, or as a graphite suspension.

In another embodiment of the present invention, the entire inner surface of the insulating body is coated with a conductive layer such as colloidally dissolved graphite powder.

In another embodiment of the present invention, the electrically conductive layer is applied as a graphite or metal line in the form of a spiral.

These and other objects and advantages of the present invention will become manifest by an inspection of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
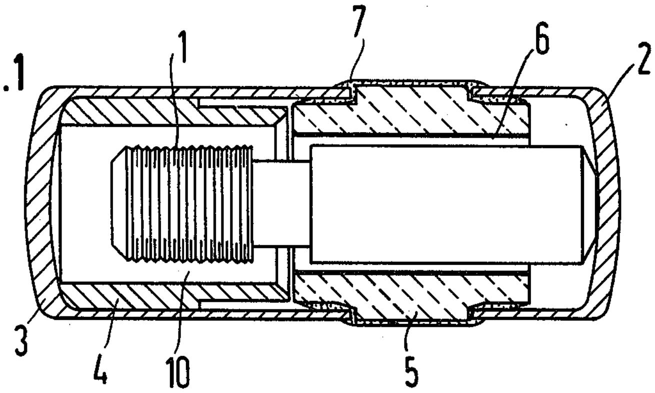
FIG. 1 is a longitudinal cross sectional view of a one-section surge voltage arrester having concentric electrodes and incorporating the present invention.

Referring now to FIG. 1, a gas-discharge surge voltage arrester is illustrated in longitudinal cross section. It has two concentrically arranged electrodes 1 and 4. The inner electrode 1 is constructed in the form of a massive cylinder which is surrounded by the hollow cylindrical electrode 4, and the space 10 between the electrodes 1 and 4 is the discharge space.

The electrodes 1 and 4 are mechanically and electrically connected to end caps 2 and 3, respectively, and the end caps serve as electrical terminals for the arrester. The end caps are separated from each other by the hollow cylindrical insulating body 5, which is located remotely from the discharge space 10. The insulating body 5 forms, with the end caps 2 and 3, a gas-tight housing. The insulating body 5 is firmly connected to the end caps 2 and 3, for example, by a solder layer 7. In accordance with the present invention, the interior surface of the insulating body 5 is provided with a conductive layer 6. The interior space within the arrester is filled by a gas, preferably a rare gas.

Figure 2:
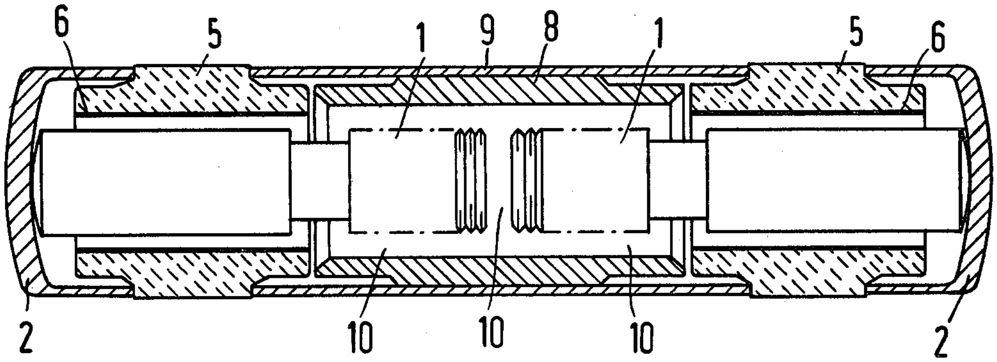
FIG. 2 is a longitudinal cross section of a two-section surge voltage arrester having concentric electrodes and incorporating the present invention.

The surge voltage arrester of FIG. 2 is a two-section arrester, and has two cylindrical electrodes 1 which are coaxial but spaced apart from each other. The two cylindrical electrodes 1 are surrounded by a hollow cylindrical middle electrode 8, and the discharge space 10 is between the two electrodes 1 and between each of the electrodes 1 and the middle electrode 8. The electrode 8 is attached to a hollow metallic cylinder 9, which forms the outer wall of the middle portion of the arrester.

The two cylindrical electrodes 1 are individually connected to one of two end caps 2, and a pair of insulating bodies 5 separate the end caps 2 from the cylinder 9 and the middle electrode 8. Both of the insulating bodies 5 are located remotely from the discharge space 10.

The hollow body formed by the end caps 2, the insulating bodies 5, and the middle cylinder 9 is gas-tight, and the interior is filled with gas, preferably a rare gas. In accordance with the present invention, an electrically conductive coating 6 is applied to the interior surface of both of the insulating bodies 5.

Figure 3:
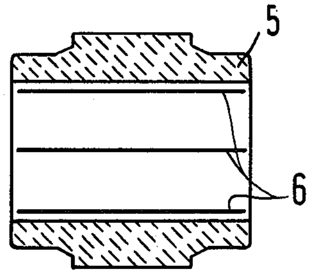
FIGS. 3 to 6 are longitudinal cross sectional views of insulating members employed in the apparatus of FIGS. 1 and 2, and which are provided with a conductive layer in accordance with the present invention.

FIGS. 3 to 6 illustrate various forms which the electrically conductive layer 6 may take. In FIG. 3, the electrically conductive layer is in the form of a number of parallel strips. The number of strips may be from one to eight, but is preferably four. FIG. 3 illustrates three of four conductive strips which are placed on the interior surface of the insulating body 5, approximately equally spaced around the periphery of the interior. The cross section of FIG. 3 does not illustrate one of the four strips.

Figure 4:
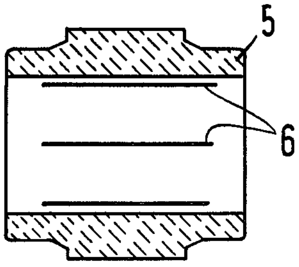

The arrangement of FIG. 4 is similar to that of FIG. 3, but the conductive strips have been terminated at a greater distance from the end faces of the insulating body 5. This distance is preferably 1.2±0.7 mm.

Figure 5:
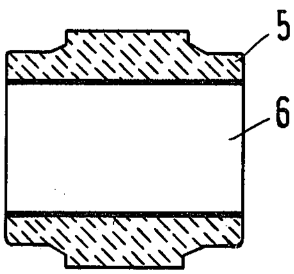

In the arrangement of FIG. 5, the entire inner surface of the insulating body 5 is covered with an electrically conductive layer 6.

Figure 6:
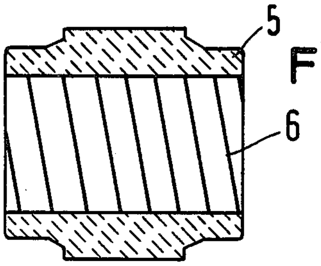

FIG. 6 illustrates an arrangement of the present invention in which there is a continuous strip of conductive material applied to the inner surface of the insulating body 5 in the form of a spiral.

The conductive strip in the several arrangements of FIGS. 3, 4 and 6 is preferably applied by metallic abrasion, or graphite abrasion, or may also be applied in the form of a graphite suspension. One effective way of applying the strips is by abrading a graphite lead against the interior surface of the insulating body 5, in the manner of marking a pencil line on the surface. In the arrangement of FIG. 6, the conductive layer which overlies the entire surface is preferably applied in the form of colloidally dissolved graphite powder.

By means of the present invention, and several arrangements specifically described, it has been found that the stationary electric charges which tend to form on the interior surface of the insulating body 5 are substantially prevented, with the result that the operation of the voltage arrester is more rapid, and thus less dependent on the rate of rise of the leading edge of the waveform of the applied voltage.

By the above description, the present invention has been described so as to enable others skilled in the art to make and use the same. It is apparent that various modifications and additions may be made without departing from the essential features of the present invention, which are intended to be defined and secured by the appended claims.

What is claimed is:

1. A gas-discharge surge voltage arrester having two concentrically arranged electrodes separated from each other by a discharge space, a hollow cylindrical insulating body interposed between said electrodes at a position remote from said discharge space, and an electrically conductive layer supported on the interior surface of said insulating body, said conductive layer taking the form of a continuous conductive surface coating.

2. Apparatus according to claim 1, wherein said conductive layer comprises from one to eight conductive strips supported on the interior surface of said insulating body in a direction parallel to the axis of said electrodes.

3. Apparatus according to claim 1, wherein said conductive layer comprises four conductive strips supported on the interior surface of said body in a direction parallel to the axis of said electrodes.

4. Apparatus according to claim 2, wherein said conductive strips each terminate at a point spaced from an end face of said insulating body, said points being spaced from said end faces by 1.2±0.7 mm.

5. Apparatus according to claim 1, wherein said conductive layer comprises a conductive coating overlying the entire interior surface of said insulating body.

6. Apparatus according to claim 1, wherein said conductive layer comprises a conductive strip in the form of a spiral applied to the inner surface of said insulating body.

7. Apparatus according to claim 1, wherein said electrically conductive layer is applied by means of metallic abrasion, graphite abrasion, or by deposition of a graphite suspension.

8. Apparatus according to claim 1, wherein said conductive layer is electrically insulated from said electrodes.

9. A method of decreasing the firing time of a surge voltage arrester having concentrically arranged electrodes spaced apart by a discharge space and insulated from each other by a hollow cylindrical insulating body located remotely from said discharge space, comprising the step of applying a conductive layer to the interior surface of said insulating body in the form of a surface coating.

10. The method according to claim 9, wherein said conductive coating is applied in the form of one to eight conductive strips applied in a direction parallel to the axis of said electrodes.

11. The method according to claim 10, wherein said strips terminate at a point spaced from the end face of said insulating body, said point being spaced from the end face of said insulating body by a distance of 1.2±0.7 mm.

12. The method according to claim 9, wherein said conductive layer is applied in the form of a conductive coating overlying the entire interior surface of said insulating body.

13. The method according to claim 9, wherein said conductive layer is applied in the form of a spiral strip on the interior surface of said insulating body.

14. The method according to claim 9, wherein said conductive layer is applied by metallic abrasion, a graphite abrasion, or the application of a graphite suspension.

15. The method according to claim 9, including the step of insulating said conductive layer from both of said electrodes.

* * * * *